United States Patent
DiLeo et al.

[11] Patent Number: 5,985,160
[45] Date of Patent: Nov. 16, 1999

[54] VIBRATIONALLY-INDUCED DYNAMIC MEMBRANE FILTRATION

[75] Inventors: Anthony J. DiLeo, Westford; Michael W. Phillips, Tyngsborough; Neal A. Brown, Lexington, all of Mass.

[73] Assignees: Millipore Corporation, Bedford; Atlantic Applied Research Corporation, Burlington, both of Mass.

[21] Appl. No.: 08/863,850

[22] Filed: Aug. 27, 1997

[51] Int. Cl.[6] ............................ B01D 29/72; B01D 35/20
[52] U.S. Cl. .......................................... 210/785; 210/388
[58] Field of Search .................................. 210/636, 785, 210/791, 106, 321.67, 650, 388, 389

[56] References Cited

U.S. PATENT DOCUMENTS

| | | | |
|---|---|---|---|
| 3,692,178 | 9/1972 | Reece | 210/425 |
| 3,970,564 | 7/1976 | Shamsutdinov et al. | 210/388 |
| 4,076,623 | 2/1978 | Golston | 210/384 |
| 4,158,629 | 6/1979 | Sawyer | 210/137 |
| 4,836,922 | 6/1989 | Rishel et al. | 210/232 |
| 4,872,988 | 10/1989 | Culkin | 210/636 |
| 4,886,608 | 12/1989 | Cook | 210/785 |
| 5,468,844 | 11/1995 | Smith | 530/366 |

FOREIGN PATENT DOCUMENTS

| | | |
|---|---|---|
| 3605065 A1 | 8/1987 | Germany . |
| 667217 A5 | 8/1988 | Sweden . |
| WO 97/02087 | 1/1997 | WIPO . |

*Primary Examiner*—John Kim
*Attorney, Agent, or Firm*—Paul J. Cook; J. Dana Hubbard

[57] ABSTRACT

A filtration process and apparatus are provided wherein feed fluid to be filtered is introduced into a small gap between two rectangular plates. At least one of the plates supports a porous filtration membrane within the gap. During filtration, at least one of the plates is oscillated to effect a continuously changing gradient of gap width between opposing surfaces of the plate. A permeate is collected and a seal is provided to prevent admixture of the permeate with either feed fluid or retentate.

18 Claims, 8 Drawing Sheets

VIBRATIONALLY-INDUCED DYNAMIC MEMBRANE FILTRATION

BACKGROUND OF THE INVENTION

1. Field of Invention

This invention relates to a method and apparatus for filtering a fluid through a porous membrane. More particularly, this invention relates to a filtration method and apparatus which creates large oscillatory fluid flow essentially parallel to a membrane surface to effect fluid flow both through the membrane and tangentially across the membrane.

2. Description of Prior Art

Membrane filtration processes have long been employed for the selective removal of contaminants from process fluid streams. For example, microfiltration membranes have been employed for the removal of bacterial contaminants from a wide variety of fluids, including beverages, parenterals and ophthalmic solutions, and for the removal of cellular debris from cell lysate streams. Ultrafiltration membranes, having a smaller pore size than microfiltration membranes, have been employed for the concentration of protein solutions as well as for the selective fractionation of proteins in solution. However, during many filtration processes, the presence of certain species can either irreversibly bind to the membrane surface or clog the membrane pores, resulting in membrane fouling that significantly decreases the rate at which fluid can permeate through the membrane structure. Similarly, the presence of certain proteins can lead to concentration polarization, which is the formation of a dense layer of highly concentrated protein near the membrane surface. This concentration polarization layer will also significantly reduce the rate at which fluid permeates through the membrane structure. Consequently, the removal of these fouling and/or concentration polarization layers can significantly improve the performance and economics of membrane filtration processes.

To minimize the formation of these layers, filtration processes have conventionally been conducted in the tangential flow filtration (TFF) mode of operation, wherein the flow of fluid is directed parallel to the membrane surface with only a fraction of the fluid being directed through the membrane. Membrane filters used in TFF processes are generally configured as flat sheet membrane cassettes where parallel membrane sheets are separated by thin, fluid-filled gaps. A fluid feed solution, typically consisting of cells, cellular debris and/or soluble proteins, is continuously recirculated at high velocities within the fluid-filled gap between the parallel membrane sheets using an external pump capable of delivering the necessary inlet pressures. The high fluid velocity serves to continually sweep the membrane surface clean of particles and proteins responsible for the formation of fouling and concentration polarization layers. As a consequence of the high transmembrane pressures created by the recirculation pump, a small fraction of the feed material is directed through the parallel membranes and is collected as permeate product.

A major limitation associated with this technology is that the external recirculation pump is responsible for creating both the high fluid velocities required for cleaning the membrane and the transmembrane pressures required for directing a portion of the fluid flow through the membrane structure. Consequently, the hydrodynamics required for cleaning the membrane surface are intimately coupled with the transmembrane pressure required for filtering the fluid material. For example, an increase in the fluid velocity across the membrane surface is accomplished by increasing the inlet pressure to the membrane device. These higher inlet pressures, while increasing the shear rates at the membrane surface, also cause more of the feed material to be directed through the membrane structure, ultimately accelerating the formation of the fouling and concentration polarization layers. In an effort to combat this phenomenon, cross flow velocity is increased, thereby increasing the upstream pressure gradient and further accelerating the fouling process. Consequently, each filtration process requires independent optimization. More importantly, highly viscous fluids and/or complex, highly fouling fluids cannot be processed at sufficiently high fluid shear rates to prevent the formation of fouling and/or concentration polarization layers.

Several techniques have been developed that attempt to address the limitations associated with conventional TFF operations. Vibrational filter systems are described in the prior art that are comprised of a constant gap spacing between two plates in which the filter elements are vibrated to prolong filter life by either minimizing cake formation or by removing existing cakes are well known. U.S. Pat. No. 3,970,564 discloses a vibration-scheme for efficiently removing pre-dried cakes from a series of stacked filter discs. U.S. Pat. No. 4,076,623 discloses a methodology in which the filter medium is reciprocated in a non-uniform fashion in a direction parallel to fluid flow in an effort to retard cake formation. U.S. Pat. No. 4,836,922 details a technique in which a series of filter cartridges are oscillated within the feed material to minimize cake formation. U.S. Pat. No. 4,872,988 describes a technique where the filter is oscillated at a prescribed frequency and displacement relative to the suspension in order to inhibit filter plugging. CH Patent 667217A5 discloses a technique in which oscillations generated by a piezoelectric ultrasound generator are transmitted to a belt filter for the subsequent removal of filter cakes.

In contrast, prior art methodologies for pulsating the fluid flow relative to the filter element, have also been disclosed in the prior art in an effort to minimize cake formation on filter devices. U.S. Pat. No. 4,886,608 describes a technique in which the vacuum downstream of a filter device is pulsed in order to remove solid material from the filter medium. DE Patent 3605065A1 discloses a similar technique in which the filtrate is pulsed in a periodic fashion to minimize cake formation. U.S. Pat. No. 3,692,178 describes a technique where the vibration of supply and exhaust air lines causes the process feed fluid to agitate within the filter housing, thereby enhancing fluid shear at the filter surface.

U.S. Pat. 5,468,844 discloses a technology consisting of a filtration channel comprised of a stationary membrane disc mounted in close proximity to a solid disc capable of being rotated at high angular velocities. The mechanical rotation of the solid disc causes the fluid between the membrane and solid disc to rotate in a direction generally parallel to the membrane surface, thereby minimizing the formation of fouling and concentration polarization layers. Flow of fluid through the membrane structure is accomplished by independently increasing the pressure upstream of membrane relative to the pressure downstream of the membrane device. However, there are two limitations associated with this technology. First, due to the circular geometry of this device, the fluid flow and shear are unevenly distributed across the plate radius, leading to a non-uniform use of the membrane surface. Second, viscous heating of the fluid caused by the overly large angular velocities of the rotating devices significantly hinder its applicability for large-scale separations.

International patent WO 97/02087 discloses a filtration technology which is comprised of disc plates that oscillate in an angular direction about a center axis. This oscillatory motion causes the fluid between the membrane discs to be moved and sheared generally in a tangential direction, effectively preventing the formation of fouling and concentration polarization layers. However, a limitation associated with this technology is that the tangential motion, velocity, and shear are highly non-uniform over the disc radius leading to a non-uniform use of the membrane surface. In order to more effectively use the membrane surface, the angular velocity of the oscillation must be increased which results in over-shearing, undesirable power consumption and heating of the fluid at the larger radii. The torsional oscillatory disc motion is supplied by a source external to the filter device and is transmitted to the device disc plates by means of a shaft. Because of the resulting increased inertia of the discs and the increasing length of the oscillating drive shaft, scale-up of the technology while maintaining efficient, uniform motion becomes impractical.

U.S. Pat. No. 4,158,629 describes the operation of a dynamic self-cleaning filter for liquid streams. In this technology, an outer resonant tube is concentrically mounted around an inner composite tube containing a filter membrane. The fluid in the annular chamber is transformed into a state of intense vaporous cavitation by causing the outer tube to resonate with the use of a sonic sinusoidal wave inducing transducer fixed to the outer tube at an antinodal point. The vaporous cavitation energy implodes the surfaces of the filter material, thereby minimizing the formation of fouling and concentration polarization layers. However, the intense energy involved with cavitation, although effective in cleaning membrane surfaces, would most likely lead to the denaturation of bioproducts sensitive to the formation of gas/liquid interfaces. In addition, cavitation upstream of polymeric membranes can conceivably damage the membrane surface.

It would be desirable to provide a method and apparatus of generating high shear forces at membrane surfaces in order to minimize fouling and concentration polarization, independent of variables controlling the feed rate and the fluid permeation rate through the membrane structure. Furthermore, it would be desirable that such a method and apparatus permit scaling up to commercially viable filtration rates. It would further be desirable to avoid cavitation that may degrade bioproduct quality and reduce membrane stability. In addition, it would be desirable to provide such a method and apparatus which improves the ease-of-use characteristics of dead-ended membrane filtration compared to conventional TFF operations.

SUMMARY OF THE INVENTION

The present invention provides a filtration method and apparatus for effecting an oscillating fluid flow shear in directions substantially parallel to a filtration membrane surface as well as effecting oscillating transmembrane pressures simultaneously over substantially the entire membrane surface. Both the tangential velocities with associated shears and the transmembrane pressures are effected as oscillations in standing wave patterns along the membrane surface.

The periodic and time-varying tangential velocity standing wave is effected in an apparatus comprising two closely spaced-apart plates, separated by a fluid-filled gap, wherein at least one of the plates supports a porous membrane. Each plate which supports a membrane is provided with a fluid path arrangement for directing permeate to an outlet means. During filtration, fluid to be filtered is introduced into the gap between the plates and at least one of the plates is caused to oscillate in a rocking motion relative to the other about a pivot line positioned between the ends of the oscillating plate to produce a continuously changing tangential gradient of gap widths along the length of the plates. This oscillation causes the width of the gap between the plates to be varied, which effects lengthwise-local fluid volume changes between the plates, which, in turn, results in a distribution of tangential fluid displacement parallel to the plates in the gap. When the rocking motion is effected at a finite frequency, this lateral fluid displacement is manifested as a substantial oscillating fluid velocity parallel to the membrane surface on the feed side. This rapid fluid oscillation exerts an oscillatory shear stress on the feed side of the membrane surface which disrupts concentration polarization and effects removal of accreted materials from the surface that would cause the membrane to become, or behave as, fouled. This oscillating fluid velocity in the gap is independent of the velocity of fluid through the membrane which is imposed and provided by an external feed pump. Most significant is that, through proper proportion of the inter-plate gap width to the length of the plates, the lateral velocity of the fluid oscillations is made much larger than the normal velocity of plate oscillation. Associated with the oscillatory lateral accelerations of the gap-fluid are an appropriate standing wave distribution of oscillating transmembrane pressures along the length of the inter-plate gap, which causes local fluid flow through the porous membrane(s) different from the mean (symmetrically higher and lower). The concentration polarization boundary layer is continuously disrupted and reformed. In addition, when the fluid pressure within the gap is sufficiently low, intermittent backflow of fluid can be effected through the membrane, thereby further reducing membrane fouling and/or the formation of a concentration polarization layer.

In a generalization of the invention using flexible plates and a suitable drive means, the normal oscillations of the plate(s) can be manifested as a standing wave or as a traveling wave distribution, at will.

DESCRIPTION OF SPECIFIC EMBODIMENTS

The process of the invention differs from prior art dynamic filtration processes in that prior art filtration processes provide a steady movement between the elements forming the gap within which filtration takes place either in a direction parallel or perpendicular to a membrane surface positioned within the gap or the movement effects a standing sinusoidal wave within the uniform gap. In the process of the invention the elements forming the gap, both of which could contain the membrane surface, are cantered in a direction perpendicular to the membrane surface resulting in a non-uniform gap dimension down the length of the membrane.

In the case of parallel movement of elements forming a gap for containing a fluid, such as is effected when the elements forming the gap are rotated with respect to each other at a relatively constant rate, the gap height remains constant. A stable, relatively time invariant pressure gradient in the radial direction is established on the upstream membrane surface in contact with the fluid to be filtered within the gap. The exposed member surface within the gap is cleaned by the moving liquid within the gap as a consequence of tangential frictional forces. In the case of perpendicular movement of the elements forming the gap relative to each other, the change in gap width is constant over a lateral extent so that there is no gap width gradient. As a consequence, any cleansing of the exposed membrane surface is effected by fluid back flow through the membrane, if any. In order to achieve large shears at the membrane surface, this system would require a compliant reservoir at the ends of the elements forming the gap for the escaping fluid to collect. Typically, a compliant reservoir is not provided due to the complexity that this imposes in the membrane sealing. Without compliant reservoirs, the fluid is forced directly through the membrane surface which causes higher fluid flow through the membrane when the gap is closed and negative fluid flow when the gap is expanded, simultaneously back flushing the membrane that will not serve to effectively disrupt the concentration boundary layer.

In contrast to the processes of the prior art, the process of this invention effects a continuously changing gap width gradient between plates. The fluid to be filtered which is introduced into the gap length is subjected to a continuous local volume change at a given portion of the gap width due to the normal relative plate movement. This continuously changing gap width gradient and, therefore, gap volume gradient effects a continuously changing tangential velocity on the upstream membrane surface. The continuously changing volume gradient on the upstream membrane surface is effected sufficiently rapidly to cause the fluid velocity in contact with the upstream membrane surface to also oscillate in directions generally parallel to the upstream membrane surface. The oscillating fluid exerts a scouring effect on the upstream membrane surface so that accumulation of a retentate component that causes plugging of membrane pores is substantially reduced or eliminated. This, in turn, substantially extends the effective life of the membrane to function as a filter. This membrane cleansing is achieved with direct fluid motion in response to continuously imposed local volume changes resulting from changes in gap width between generally parallel plates rather than for example, through acoustic imposed implosion.

This change in volume, in turn, also leads to a pressure gradient which effects fluid flow through the membrane in contact with the fluid. Zones of relatively high pressure within the gap between the plates, where the plates are instantaneously positioned relatively far from each other, effect fluid passage through the membrane larger than the mean. Zones of relatively low pressure within the gap between the plates, where the plates are instantaneously positioned relatively close to each other, effect reduced fluid flow relative to the mean or no fluid flow through the membrane. When the fluid pressure within the gap is sufficiently low, intermittent backflow of fluid can be effected through the membrane. This fluid backflow effects flushing of the membrane surface in contact with the fluid within the gap, thereby further reducing membrane fouling or the formation of a concentration polarization layer.

In accordance with this invention, a filtration apparatus is provided which includes two closely spaced apart plates, at least one of which supports a membrane, and which provide a fluid flow path which permits permeate collection. A seal is provided which seals the membrane or membranes so that the feed is contained and permeate produced in the process is not mixed with either feed or retentate produced in the process. The plates can be formed of a rigid or flexible material so long as the desired continuously changing gap width gradient is achieved when the plate(s) is vibrated. A fluid feed inlet to the gap is provided to introduce feed into the gap. At least one of these plates is vibrated to effect a rocking motion or an undulating wave-like motion so as to effect the desired continuously changing gap width gradient. A fluid feed inlet to the gap is provided to introduce feed into the gap. A retentate outlet is also provided to remove retentate from the gap.

In accordance with one embodiment of the apparatus of this invention, two rigid plates, at rest, having substantially parallel surfaces are positioned spaced apart from each other to form a small gap. The small gap dimension is significantly smaller than the length of the elements forming the gap by a factor of 100 to 10000 and preferably 100 to 1000. At least one of the plates supports a porous membrane and is provided with fluid flow paths which permit permeate collection. A seal is provided to seal the membrane or membranes so as to prevent admixture of fluid feed or retentate produced in the process with permeate produced in the process. At least one of the two rigid plates is rocked at a vibration frequency relative to the opposing plate so that the gap width gradient between the two plates is contiuously changed in a manner that portions of the two plates move toward each other while the remaining portions of the two plates move away from each other. Typical frequencies at which this rocking motion is effected is between about 20 and about 1000 Hz and more usually between about 30 and about 120 Hz. The effective wavelength of the vibration is very much larger than the fluid filled gap so as to substantially amplify the velocity of fluid oscillation between the plates relative to the velocity of the plates themselves. Equivalent wavelengths for elements that are pivoted at the center, which is the preferred embodiment of this invention, are about 2 times the total length of the element. The wavelength for elements that are pivoted off center increases to 4 times the larger of the two distances from the pivot point to the end of the element.

The spaced apart plates form a gap into which fluid to be filtered is introduced. A fluid inlet to introduce fluid feed into the gap, a fluid outlet to remove retentate from the gap and a fluid outlet to remove permeate passed through the membrane also are provided. The periphery of the membrane or membranes supported on the plates within the gap are flexibly sealed to prevent admixture of the permeate with either the retentate or the fluid feed. At least one of the plates is connected at each of two opposing ends with a driver apparatus which widens and narrows the gap between the two plates at the operating frequency. The two drivers are operated at cycles which are out of phase with each other so as to maximize the effective driving force and driver efficiency. Thus, it is preferred that the two drivers are operated 180 degrees out of phase with each other. Since the plates in this embodiment are intended to be rigid, flex of the plates is minimized or prevented so that, with the exception of two points in time during the rocking cycle when the two plates are exactly parallel, the gap between the two plates varies linearly along the length between the two drivers. The rocking motion of at least one of the plates is effected about a pivot point positioned between the two drivers, preferably positioned substantially equidistant from the two drivers. The drivers can comprise any conventional device for rapidly vibrating the ends of the plates such as electromagnet, hydraulic or mechanical or the like.

Figure 1:
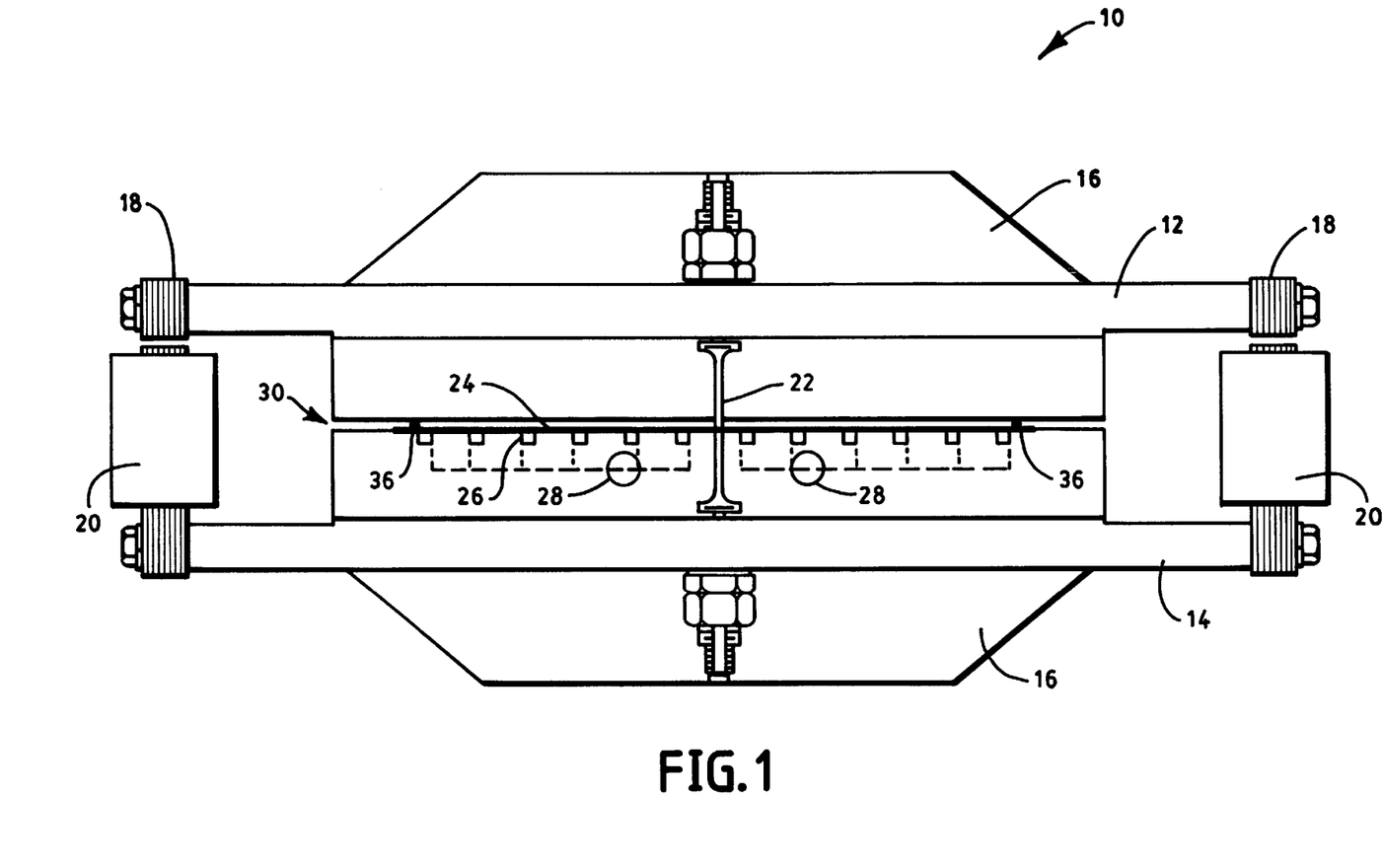
FIG. 1 is a longitudinal side view of an apparatus of this invention.
Figure 2:
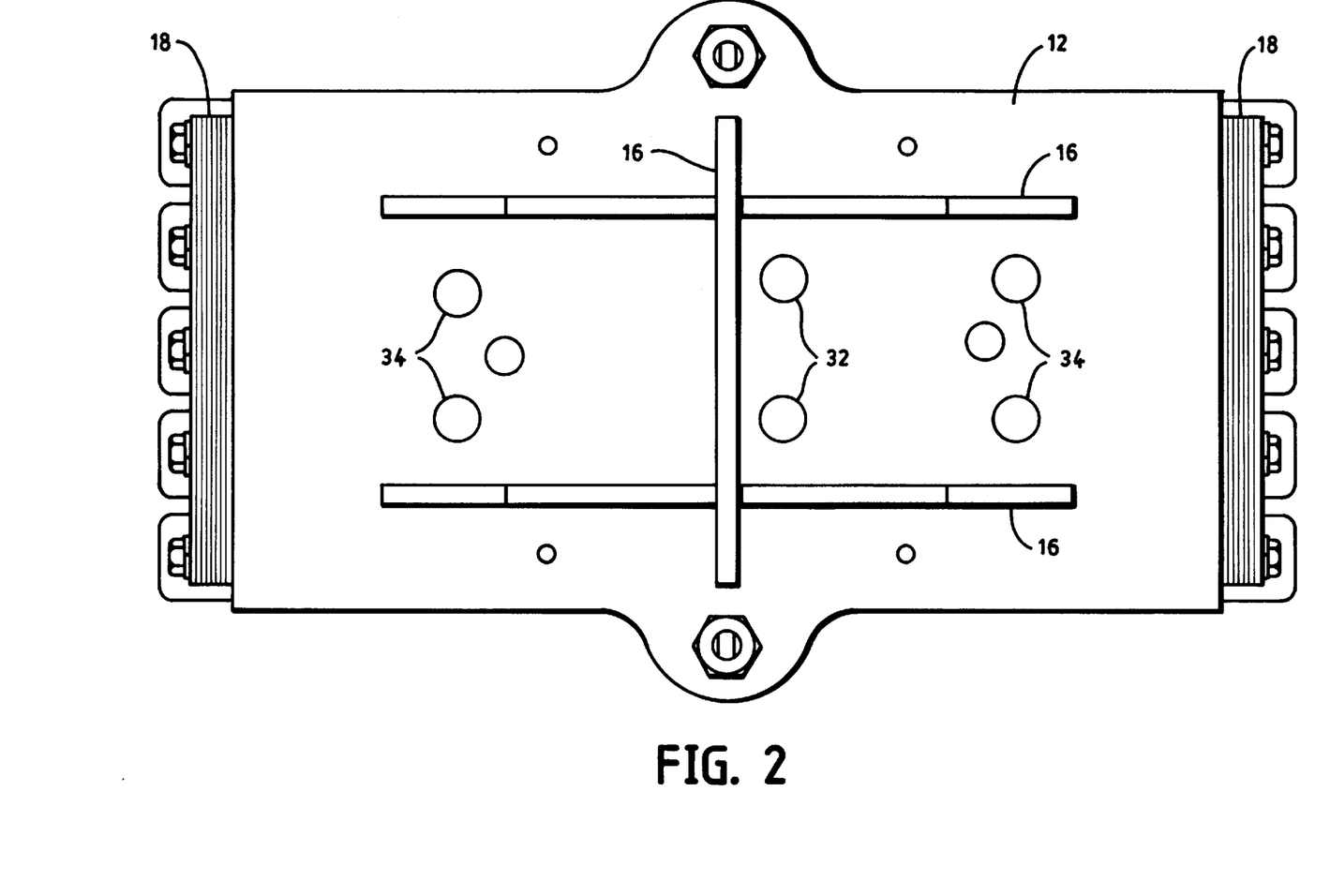
FIG. 2 is a top view of the apparatus of FIG. 1.
Figure 3:
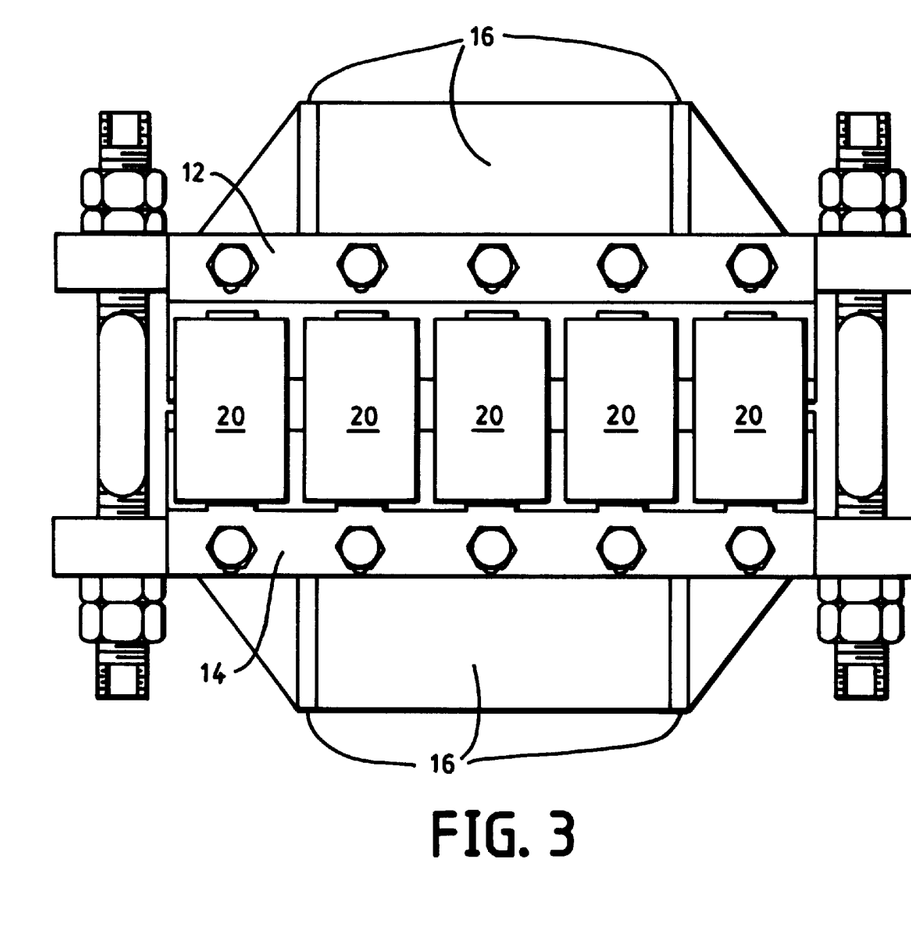
FIG. 3 is a widthwise side view of the apparatus of FIG. 1.

Referring to FIGS. 1–3, an embodiment of the apparatus of this invention is illustrated. The filtration apparatus 10 includes generally rectangular plates 12 and 14 made of any suitable stiff material such as stainless steel which can be reinforced with ribs 16 to increase their bending rigidity. The extreme ends 18 of plate 12 are formed of a magnetic material. Electromagnets 20 are positioned close to the magnetic material 18 on plate 12. Plate 14 is supported and restrained by tie rods 22 which comprises a pivot point or pivot line about which plate 12 oscillates in a rocking motion. These adjustable length rods restrain and position the plates against the internal pressure in the fluid filled gap and control the gap dimension. A porous filtration membrane 24 is supported on plate 14. The surface of plate 14 which contacts the membrane 24 is provided with channels 26 which direct permeate passed through the membrane 24 to permeate outlets 28 which are connected to conventional fluid collection apparatus (not shown). The plates 12 and 14 and membrane 24 are positioned to form a gap 30 into which feed fluid can be introduced. Feed fluid is introduced into gap 30 through inlets 32. Retentate is removed from the apparatus 10 through outlets 34 connected to fluid collection apparatus (not shown). O ring seal 36 extends about the periphery of membrane 24 to seal permeate from admixture with either feed fluid or retentate. The O ring 36 is sufficiently flexible to permit plate 12 to oscillate while retaining its sealing function. It is preferred that the electromagnets 20 positioned at opposing ends of plate 12 be operated 180 degrees out of phase to maximize the effective driving force and minimize heat build-up.

The following examples illustrate the invention and are not intended to limit the same.

EXAMPLE 1

Utilizing the apparatus shown in FIGS. 1–3, a sample of BioMax100 membrane, a modified polyethersulfone ultrafiltration membrane manufactured by Millipore Corporation, Bedford, Mass., was positioned within the test cell such that the skinned layer of the membrane was in contact with the feed stream. The test-cell was configured such that the nominal fluid-filled gap height between the membrane surface and the top rigid plate was approximately 0.25 mm by uniformly adjusting the length of the support tie rods. An external alternating current power supply was used to oscillate the plates at an approximate frequency of 120 Hz. The amplitude of vibration was varied in order to obtain various induced shear rates within the test cell. The maximum amplitude of relative plate vibration was approximately 0.10 mm, resulting in the gap height at the ends of the test cell periodically varying from 0.15 mm to 0.35 mm. The vibrationally-induced shear rates were calculated from pressure signals obtained from piezoelectric dynamic pressure transducers (PCB Piezotronics, Depew, N.Y.) mounted eccentrically from the central pivot line.

Figure 4A:
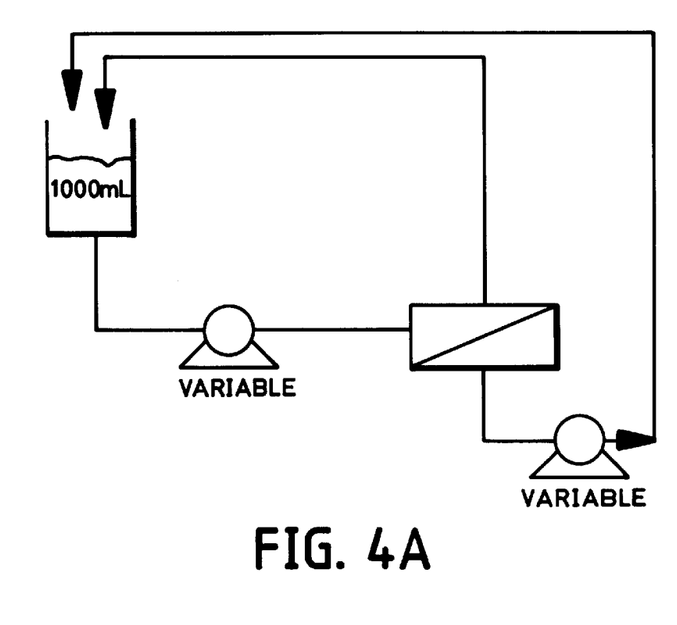
FIG. 4 is a schematic view of the experimental setup employed in Examples 1 and 2.
Figure 4B:
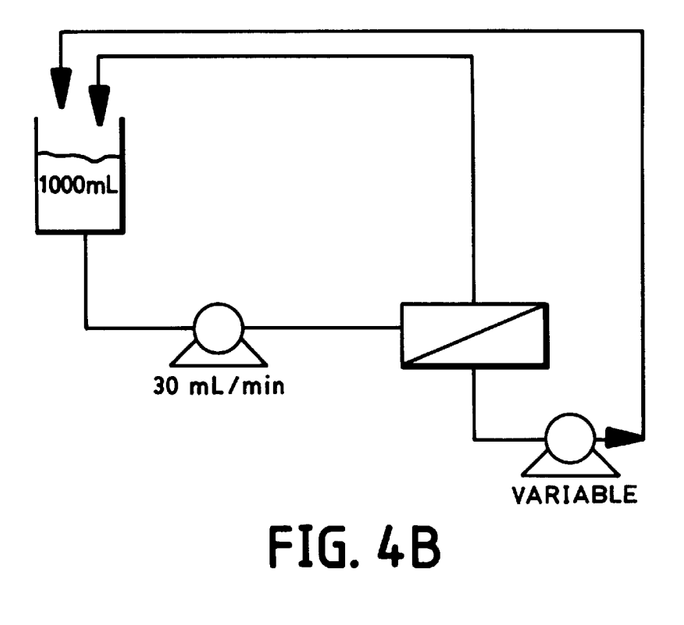

The entire vibrational test cell, complete with membrane, was configured into a total recirculation process as shown in FIG. 4. The challenge solution, comprised of a 1% T-500 Dextran solution (Pharmacia) prepared in phosphate buffered saline, was placed into a feed reservoir. The feed solution was continuously recirculated through the test-cell with the use of a peristaltic pump at a rate of 30 mL/min. The retentate from the test-cell was recirculated back to the feed reservoir. A needle valve located within the retentate stream was used to produce a back pressure of approximately 30 psi within the test-cell. Permeate fluid, drawn from the test-cell with the use of a dedicated peristaltic pump, was also recirculated back to the feed reservoir, thereby maintaining a constant dextran concentration within the feed reservoir.

A flux-excursion experiment was conducted to determine the limiting-flux of the test system. In a flux-excursion experiment, the permeate flow rate is set at some low value. After a 30 minute equilibration procedure, the feed, retentate, and permeate fluid pressures are measured and the transmembrane pressure (defined as $0.5*(P_{feed}+P_{retentate})-P_{permeate}$) is calculated. The permeate flow rate is stepwise increased, the system is allowed to re-equilibrate, and the transmembrane pressure is again calculated. This procedure is repeated until the calculated transmembrane pressure exceeds some high value indicative of the formation of concentration polarization and/or fouling layers. As a basis of comparison, the same limiting-flux experiment was conducted with a BioMax100 membrane configured within a Minitan-S tangential flow device available from Millipore Corporation, Bedford, Mass. This device was configured with feed and permeate screens to increase the local shear at the membrane surface, thereby enhancing the performance of such a device. The shear rate in these tangential flow devices are generally controlled by varying the feed crossflow rate sweeping across the membrane surface. In these experiments, the crossflow rate was varied from 200 mL/min to 550 mL/min, resulting in shear rates of approximately 6000 sec$^{-1}$ and 16500 sec$^{-1}$, respectively.

Figure 5:
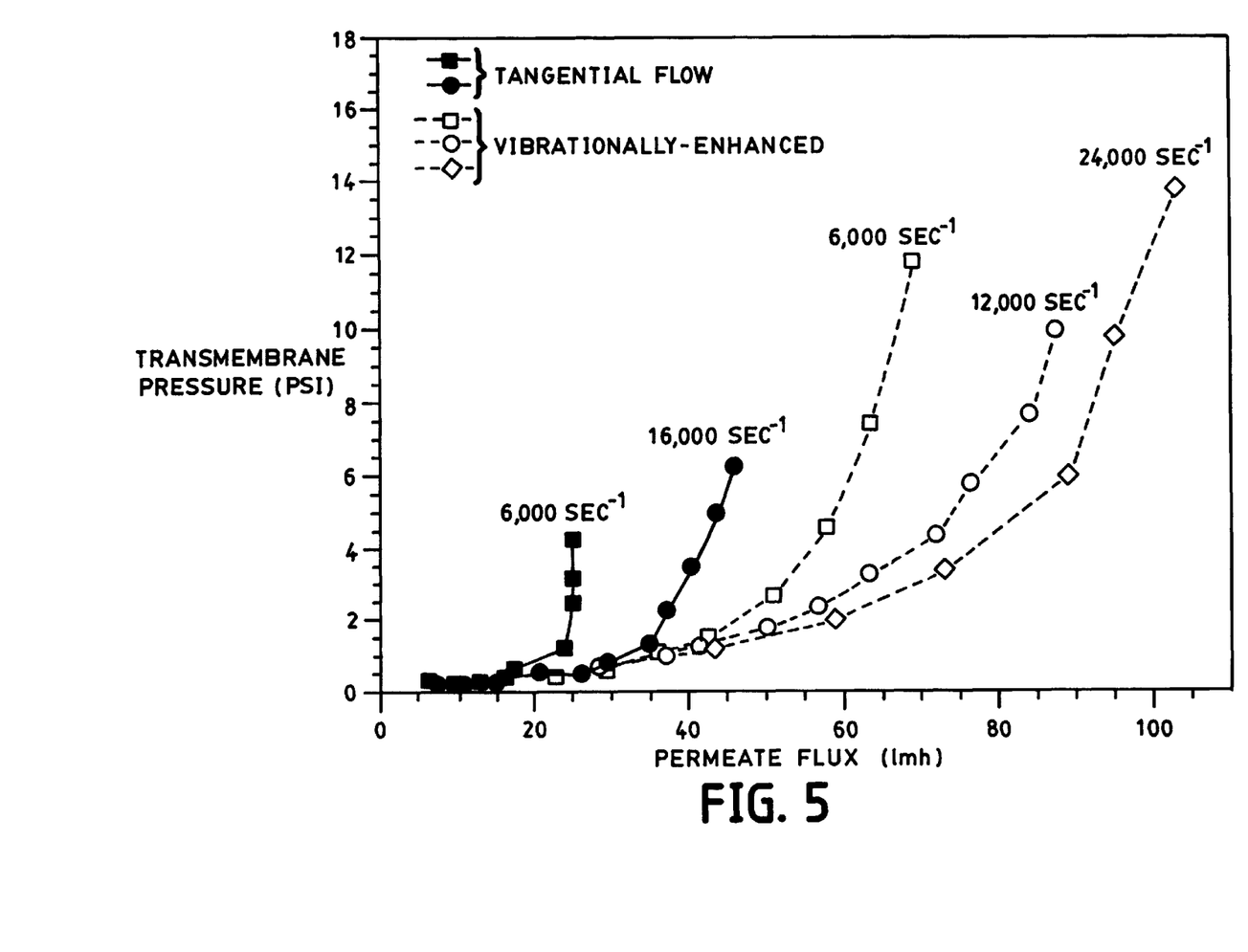
FIG. 5 is a graph representing limiting flux curves obtained under conventional TFF and vibrationally-enhanced filtration modes at various induced shear rates as described in Example 1.

The results from the limiting-flux experiments for both the vibrationally-enhanced device and tangential flow device are shown in FIG. 5, where the measured time averaged transmembrane pressure is plotted as a function of permeate flux for various maximum shear conditions. Qualitatively, the shape of the limiting-flux curves obtained with the vibrationally-enhanced and conventional Tangential Flow Filtration (TFF) devices are similar. However, the performance of the vibrationally-enhanced device was significantly better than the performance of the standard TFF device. For example, at a maximum shear rate of approximately 6000 sec$^{-1}$, the limiting flux of the vibrationally-enhanced device was approximately 2–3 times higher than with conventional TFF operation. Hence, the shear induced by the vibrational device was more effective in minimizing the formation of concentration polarization and fouling layers. In addition, the largest achievable maximum shear rate in the vibrationally-enhanced device was significantly higher than could be achieved in the conventional TFF device. The reason for this is that the shear induced in the vibrational device unlike that of the conventional TFF device is independent of the feed flow rate, and hence, the inlet pressure.

EXAMPLE 2

Figure 6:
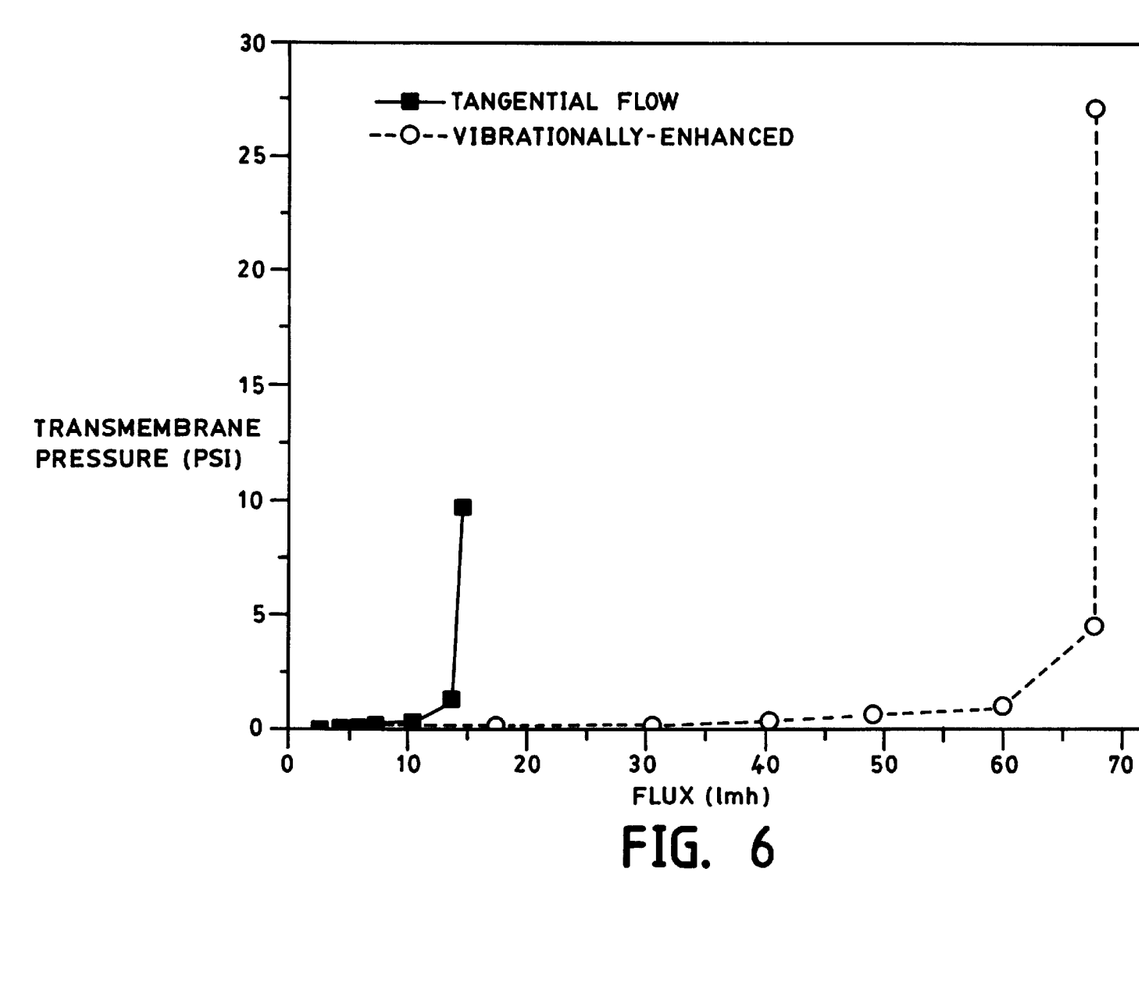
FIG. 6 is a graph representing experimentally measured dynamic transmembrane pressure curves obtained under conventional TFF and vibrationally-enhanced filtration modes of operation as described in Example 2.

As in Example 1, a limiting-flux experiment was conducted with a second test system to process highly fouling mixtures, such as cell lysate solutions. In this system, the feed solution consisted of approximately 0.2% RNA, 0.5% dextran of molecular weight ranging from 2 to 40 million, and 2.0% BSA. A sample of 0.1 μm hydrophilic Durapore membrane (Millipore Corporation) was positioned within the vibrational test-cell and the nominal gap height adjusted to 0.25 mm. An external power supply was used to oscillate the plates at a frequency of 120 Hz. The amplitude of vibration was established that resulted in a vibrationally-induced shear rate of approximately 16,000 $sec^{-1}$, as determined by the piezoelectric dynamic pressure transducers mounted on the test cell. The limiting-flux results for this test system and for a Minitan-S control are shown in FIG. 6. As seen in FIG. 6, under similar maximum shear conditions, the limiting flux obtained with the vibrationally-enhanced system was approximately 4–5 times higher than that achieved with conventional TFF operation. Therefore, even for systems containing highly fouling species in which the fouling can essentially be characterized as non-reversible, the vibrationally-enhanced filtration system significantly increases the maximum achievable filtration rate.

EXAMPLE 3

Figure 7A:
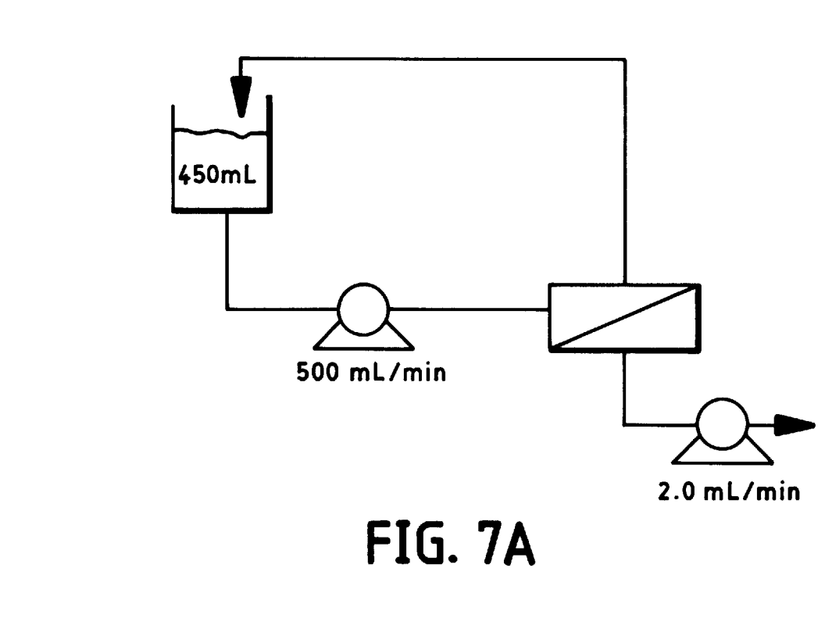
FIG. 7 is a schematic view of the experimental setup employed in Example 3.
Figure 7B:
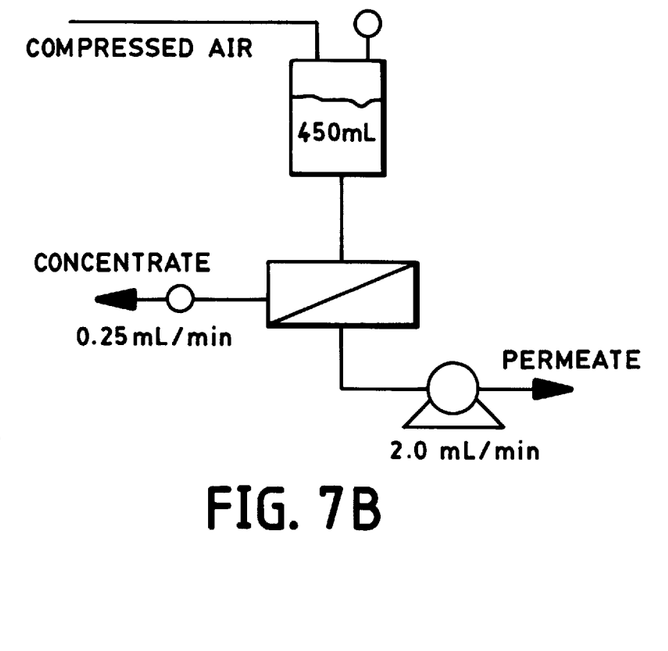

To further exemplify the advantages of vibrationally-enhanced filtration, process-simulation experiments were conducted with both the vibrationally-enhanced device and the conventional tangential flow device. A schematic representation of the processes employed in this example are depicted in FIG. 7. For the conventional TFF system, 450 mL of the cell lysate model stream (see Example 2) was placed into a standard feed reservoir. The feed solution was recirculated through a MiniTan-S device (configured with the 0.1 μm hydrophilic Durapore membrane) at a rate of 500 mL/min, corresponding to a shear rate of approximately 10000 $sec^{-1}$. The retentate from the device was returned to the feed reservoir. The permeate flow rate was maintained at 2.0 mL/min (20 liters/ square meter/hour flux, lmh) with a peristaltic pump located downstream of the membrane. Unlike the flux excursion experiments detailed in Examples 1 and 2, the permeate fluid was not returned to the feed reservoir. In this manner, the concentrations of retained species within the feed reservoir would increase with time. Pressure transducers located on the feed, retentate, and permeate lines were used to monitor the mean transmembrane pressure as a function of time. The system was shut down after the transmembrane pressure exceeded 15 psi, a value indicative of severe concentration polarization and/or fouling.

For the vibrationally-enhanced filtration system, approximately 1300 mL of the cell lysate model stream was placed into a stainless steel pressure vessel. With the use of compressed air, the feed solution was delivered to the vibrationally-enhanced device (configured with the 0.1 μm hydrophilic Durapore membrane) at 30 psi. An external power supply was used to oscillate the plates at 120 Hz and at an amplitude such that the vibrationally-induced shear rate was approximately 15000 $sec^{-1}$. The permeate flow rate was maintained at 2.0 mL/min (20 lmh flux) with the use of a peristaltic pump located downstream of the device. A needle valve located on the retentate line was adjusted such that fluid concentrate was removed at a rate of 0.25 mL/min. Neither the permeate nor concentrate streams were returned to the feed reservoir. Pressure transducers located on the feed and permeate lines were used to monitor the transmembrane pressure as a function of time. As with the tangential flow system, the vibrationally-enhanced system was shut down after the transmembrane pressure exceeded 15 psi.

Figure 8:
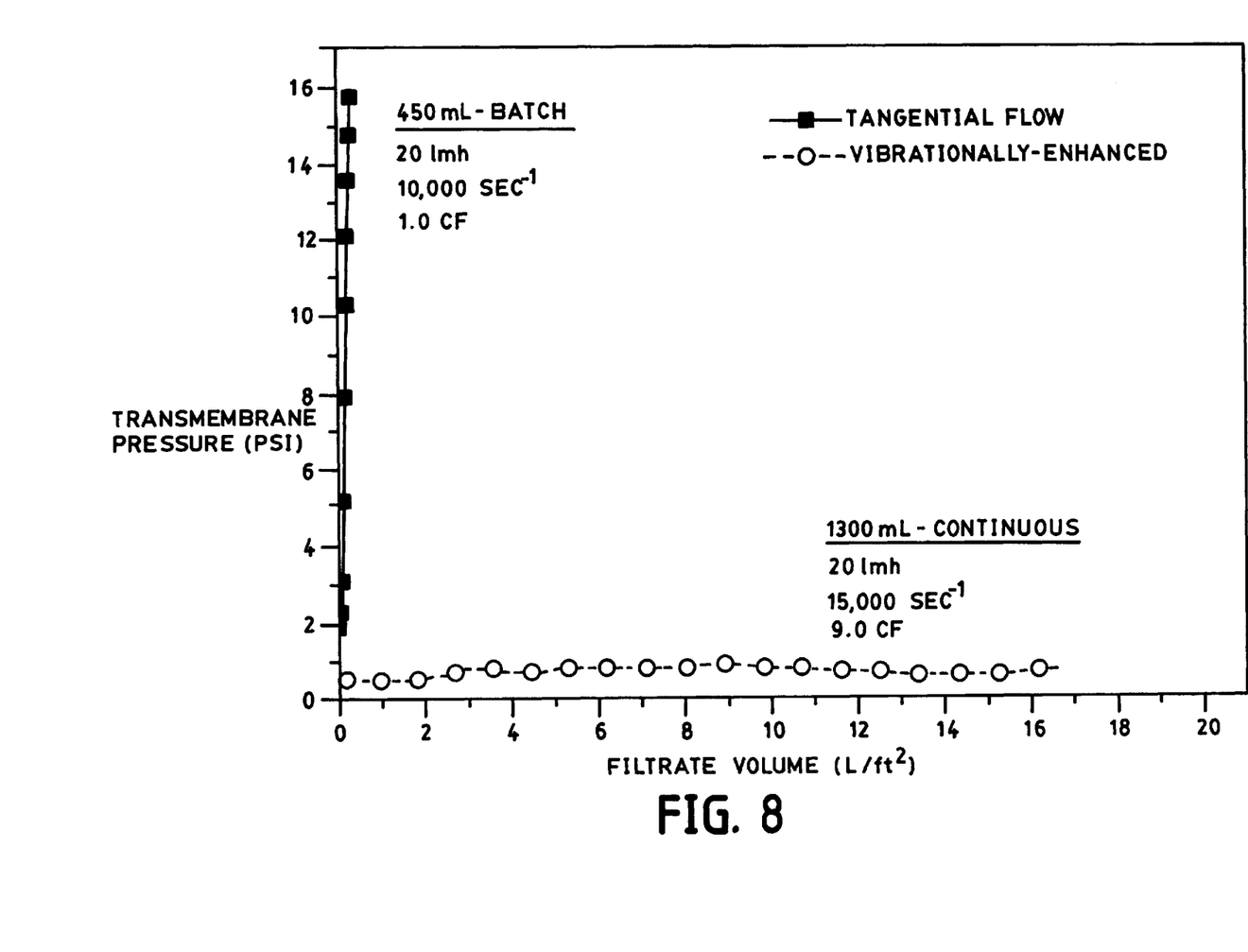
FIG. 8 is a graph representing experimentally measured dynamic transmembrane pressure curves obtained under conventional TFF and vibrationally-enhanced filtration modes of operation as described in Example 3.

The transmembrane pressure profiles as a function of volume of fluid filter through the membrane (expressed as liters per square foot of membrane area) are shown in FIG. 8 for both the vibrationally-enhanced and conventional TFF systems. As seen in FIG. 8, the TFF device was able to process only 20 mL of the 450 mL feed solution before the transmembrane pressure exceeded 15 psi. Severe concentration polarization and fouling prevented further processing. However, the vibrationally-enhanced system was able to continually process the entire 1300 mL batch without the transmembrane pressure exceeding even 1 psi. The vibrationally-induced shear was effective in preventing the formation of concentration polarization and fouling layers that typically limit the useful life of membrane filters.

This example effectively illustrates the advantages of the vibrationally-enhanced device. First, the shear induced within the vibrational device is independent of the feed flow rate. Therefore, an expensive pump was not required to introduce the feed material into the filter device. Instead, the feed material was introduced with the use of pressurized gas. Second, the vibrationally-enhanced system can be run in a steady-state, single-pass mode of operation whereas conventional TFF systems must be run in a batch mode of operation. The steady-state mode of operation is a much more stable, robust and economic process. Finally, the vibrationally-enhanced device was able to process approximately 60 times more of the feed material than the conventional TFF device. In fact, the vibrationally-enhanced device was able to process the entire feed solution such that approximately 90% of the feed volume permeated through the membrane on a single pass, whereas only 10% was removed via the concentration stream. Overall, the vibrationally-enhanced system was able to realize an overall concentration factor of approximately 8.0. This magnitude of concentration factor is rarely achieved in conventional TFF systems. For these reasons, it is believed that this technology is well suited for processing even high solids, high viscosity solutions that conventional TFF devices are unable to process.

We claim:

1. A filtration process which comprises:
    forming a gap between two plates wherein at least one of said plates supports a porous filtration membrane,
    introducing a feed fluid into said gap,
    rapidly vibrating opposing ends of at least one of said plates to oscillate at least one of said plates about a pivot point positioned between opposing ends of said plates thereby to effect a continuously changing gradient of gap width between opposing ends of said plates,
    removing a retentate from said gap,
    removing a permeate from said gap and
    sealing said gap to prevent admixture of said permeate with either of said retentate or said feed fluid.

2. The process of claim 1 wherein opposing ends of both of said plates are rapidly vibrated about said pivot point.

3. The process of claim 2 wherein opposing ends of both of said plates are vibrated substantially 180 degrees out of phase with respect to each other.

4. The process of claim 3 wherein said pivot point is positioned substantially equidistant between said opposing ends.

5. The process of claim 2 wherein said pivot point is positioned substantially equidistant between said opposing ends.

6. The process of claim 1 wherein opposing ends of said at least one plate are vibrated substantially 180 degrees out of phase with respect to each other.

7. The process of claim 6 wherein said pivot point is positioned substantially equidistant between said opposing ends.

8. The process of claim 1 wherein said pivot point is positioned substantially equidistant between said opposing ends.

9. The process of any one of claims 1, 2, 6, 3, 8, 5, 7 or 4 wherein both of said plates supports a porous filtration membrane.

10. A filtration apparatus which comprises:

two plates spaced apart from each other to form a gap, at least one of said plates supporting a porous filtration membrane within said gap, means for introducing a feed fluid into said gap, means for removing a retentate from said gap, means for removing a permeate passed from said gap through said porous filtration membrane, sealing gap means to prevent admixture of said permeate with either said feed fluid or said retentate, and means for rapidly oscillating opposing ends of at least one of said plates about a pivot point positioned between opposing ends of said plates to produce a continuously changing gap width gradient between opposing surfaces of said plates.

11. The apparatus of claim 11 wherein both of said plates are oscillated by said means for rapidly oscillating.

12. The apparatus of claim 11 wherein said means for rapidly oscillating said at least one of said plates are positioned on opposing ends of each said plate.

13. The apparatus of claim 12 wherein said means for rapidly oscillating at opposing ends of each plate are operated substantially 180 degrees out of phase with each other.

14. The apparatus of claim 10 wherein said means for rapidly oscillating said at least one of said plates are positioned on opposing ends of said plate.

15. The apparatus of claim 14 wherein said means for rapidly oscillating are operated substantially 180 degrees out of phase with respect to each other.

16. The apparatus of any one of claims 10, 11, 14, 12, 15 or 13 wherein said means for oscillating comprises an electromagnet.

17. The apparatus of any one of claims 10, 11, 14, 12, 15 or 13 wherein said plates are rigid.

18. The apparatus of claim 17 wherein said means for rapidly oscillating comprises an electromagnet.

* * * * *